Dec. 13, 1955 L. H. EHRMAN 2,726,627
SUPERIMPOSED LIGHT VERNIER
Filed April 13, 1953 2 Sheets-Sheet 1
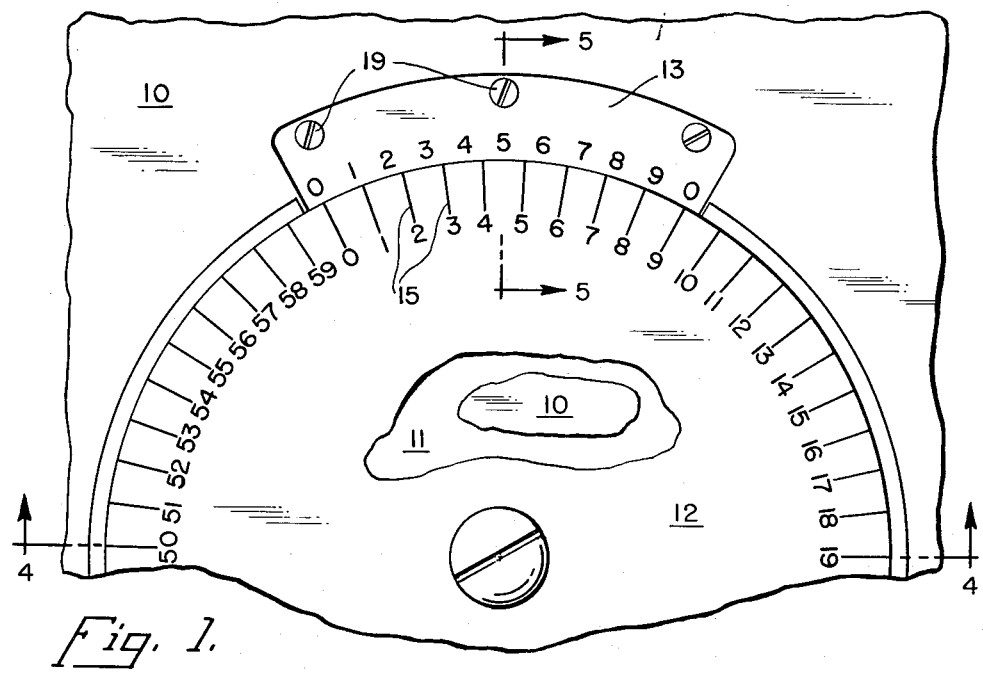
Fig. 1.
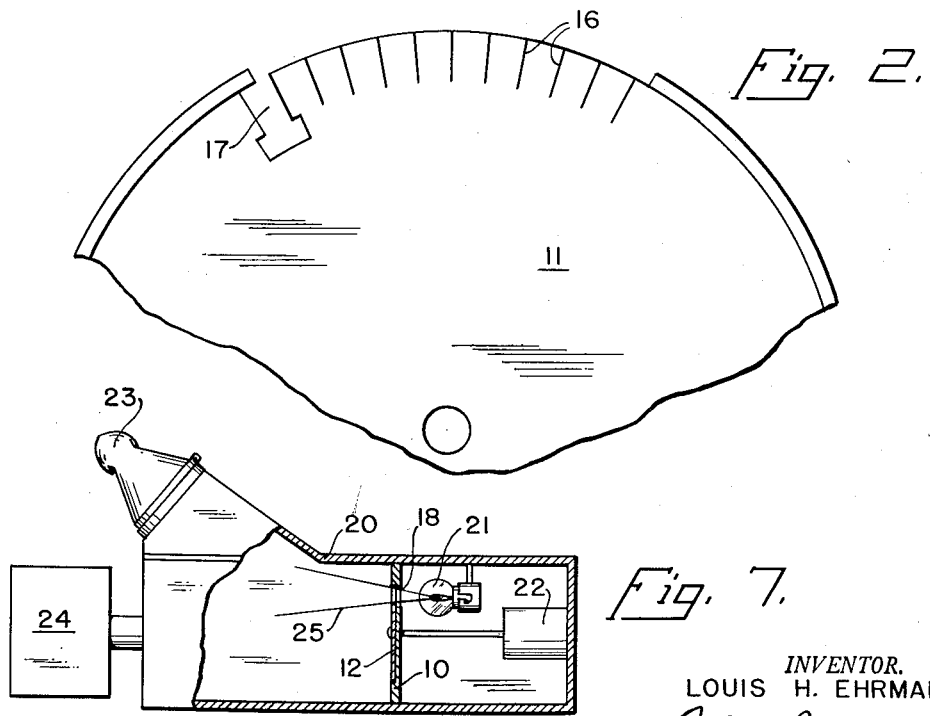
Fig. 2.
Fig. 7.
INVENTOR.
LOUIS H. EHRMAN
BY
ATTORNEYS Dec. 13, 1955   L. H. EHRMAN   2,726,627
SUPERIMPOSED LIGHT VERNIER Filed April 13, 1953   2 Sheets—Sheet 2

INVENTOR.
LOUIS H. EHRMAN
BY
ATTORNEYS

United States Patent Office

2,726,627
Patented Dec. 13, 1955

2,726,627

SUPERIMPOSED LIGHT VERNIER

Louis H. Ehrman, Girdletree, Md.

Application April 13, 1953, Serial No. 348,604

5 Claims. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

This invention relates in general to improvements in vernier scales and more particularly to vernier scales of the rotary dial type.

It has been common in the prior art to provide graduated dials, having main or cardinal graduations and indicia therefor, which rotate relative to fixed vernier scales, the latter being graduated to indicate parts or divisions between cardinal graduations which are to be added to the reading of a cardinal graduation. The graduations on such a dial and vernier scale are usually in the form of engraved lines which must be visually observed, or where a large number of sequential readings are required, they may be photographed. In either case, the alignment of the graduations requires careful evaluation which is tedious and time consuming.

One of the objects of this invention is to provide position indicating apparatus of the vernier type in which only the correct vernier reading is visible.

Another object is to provide position indicating apparatus of the foregoing type employing a rotary graduated dial superimposed on a graduated vernier scale, the graduations of both being in the form of windows through which light may pass.

Other objects and many of the attendant advantages of this invention will be readily appreciated as the same becomes better understood by reference to the following detailed description when considered in connection with the accompanying drawings wherein:

Fig. 1 is a fragmentary front elevation of a dial assembly, forming the subject of the invention, as it appears when illuminated at its front face, portions being broken away;

Fig. 2 is a similar view of a vernier plate, forming a part of the assembly of Fig. 1;

Fig. 7 is a side elevation of a viewing box, portions being broken away to reveal the general interior arrangement of parts.

Figure 3:
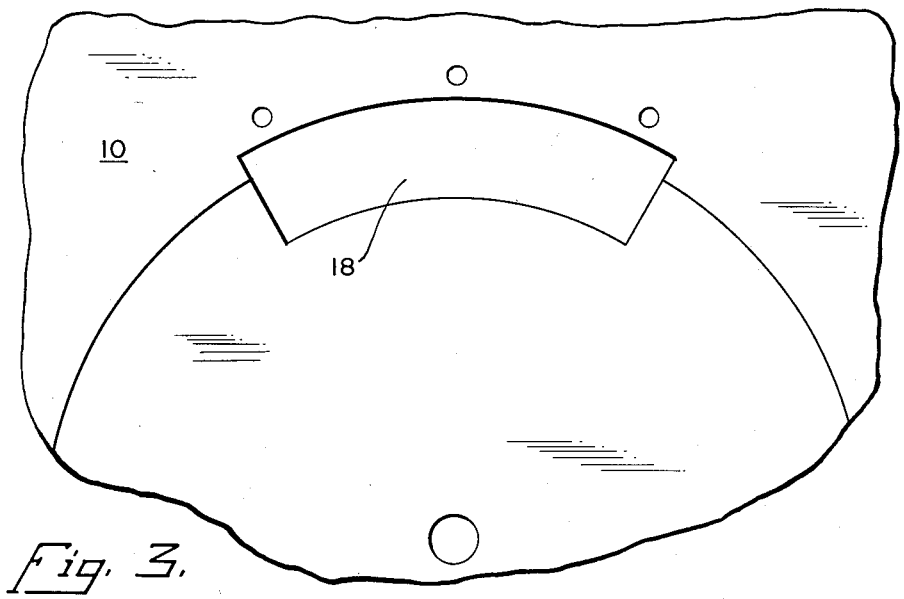
Fig. 3 is a similar view of a supporting plate forming part of the assembly of Fig. 1.
Figure 4:
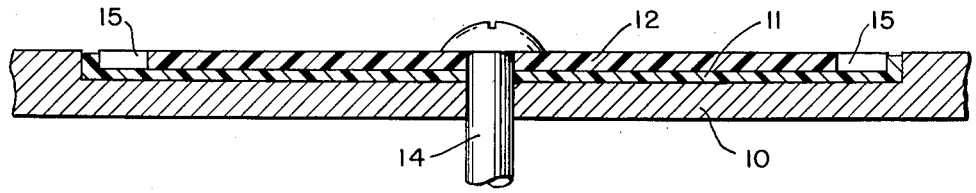
Fig. 4 is a section taken on line 4—4, Fig. 1.
Figure 5:
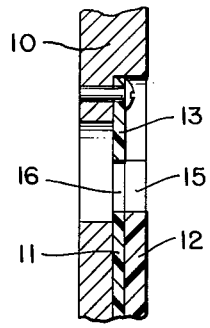
Fig. 5 is a section taken on line 5—5, Fig. 1.

Referring in detail to the drawing, the dial assembly previously referred to comprises, in general, a stationary plate 10, a vernier plate 11 affixed thereto, a dial 12, and a vernier scale number segment 13.

Vernier plate 11 is immovably affixed to one face of plate 10 in any suitable manner and dial 12 is superimposed over the outer face of plate 10 and supported for rotation by a shaft 14 which extends through aligned apertures in plates 10, 11.

Dial 10 is provided with equiangularly spaced slots 15 in its periphery which, as illustrated, are 6° between centers of adjacent slots. As best shown in Fig. 2, plate 11 is provided with similar slots 16 in its periphery the angular distance between which is substantially equal to the angular distance between nine slots in the dial divided by ten. An aperture or window 17 is also provided in plate 11, the purpose of which will subsequently be described.

As best shown in Fig. 3, plate 10 is provided with an aperture or window 18, the angular extent of which is slightly greater (about 61°) than the angular extent of the vernier slots. Segment 13 is secured to plate 10 in any suitable manner, such as by screws 19.

Dial 12 is preferably made of laminated plastic material (Lamacoid) which has an opaque layer and a transparent layer, the opaque layer being on the face as viewed in Fig. 1.

The indicia 1, 2–59 on dial 12 are engraved in the opaque layer to a depth such that light may pass through the engravings. The vernier numbers dial 13 may be constructed of the same material and similarly engraved. Vernier plate 11 may also be of the same material. Plate 10 may be constructed of any opaque material, such as metal.

Figure 6:
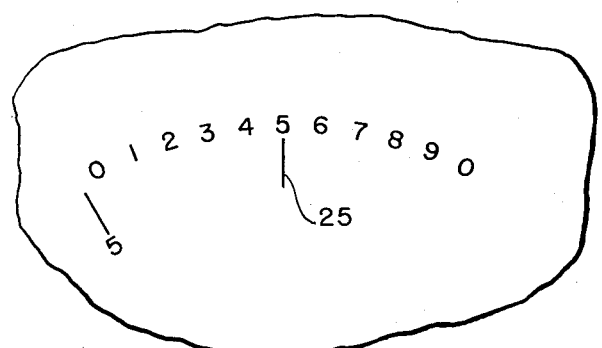
Fig. 6 is an exemplary view, similar to Fig. 1; showing only the visible portions of the dial assembly when viewed in darkness; with illumination at the rear thereof, the indicia in black representing visible light and the remainder of the figure representing black.

An application of the invention is illustrated in Fig. 7 wherein plate 10 and the associated parts previously described are disposed within a closed box 20. A suitable light source 21 is disposed at the rear of plate 10 and projects light through windows 17, 18. A selsyn motor 22 periodically rotates dial 12 to various positions and the dial readings may be visually observed through a viewing eyepiece 23 or recorded on film by a camera 24. Fig. 6 illustrates such a reading wherein light passes through cardinal number 5 and its associated slot, through the aligned slots of the dial and vernier plate, and through the vernier numbers 0, 1–0, the light beam 25 showing that .5 is to be added to the cardinal reading 5, the total reading being 5.5.

A specific application of the invention comprises a plurality of dials of the type described which indicate range, azimuth and elevation data obtained by radar apparatus. It will be apparent, however, that the invention is of general utility and has wide application in the art of indicating apparatus.

Many modifications of the invention will become apparent to those skilled in the art. For example, window 17 may be in various other locations relative to vernier numbers segment 13 and dial 12 may take the form of a member movable rectilinearly with respect to a straight vernier, rather than an arcuate vernier. The term "window" as employed in the appended claims is intended in its broadest sense, except as otherwise limited, as any means for transmitting light, which may be apertures of various shapes or transparent portions which serve the same function.

Obviously many modifications and variations of the present invention are possible in the light of the above teachings. It is therefore to be understood that within the scope of the appended claims the invention may be practiced otherwise than as specifically described.

What is claimed is:

1. A pair of relatively movable scales of the type wherein the first scale is provided with equi-spaced cardinal graduations and indicia for same, and the second scale is provided with equi-spaced graduations and indicia for same which represent divisions of the distances between cardinal graduations, the improvements wherein the first scale is superimposed over the second scale and the graduations of both scales are in the form of windows adapted to permit light to pass therethrough, the construction and arrangement being such that when the scales are disposed in any particular relationship, a cardinal indicia is visible to indicate the approximate relative positions of the scales, the indicia on the second scale is visible, and a window of the first scale is aligned over a window of the second scale to permit light to pass through the aligned windows to indicate the substantially exact relative positions of the scales.

2. Apparatus in accordance with claim 1 wherein the windows are in the form of apertures extending through the first and second scales.

3. Apparatus in accordance with claim 2 wherein the apertures are narrow straight slots.

4. Apparatus in accordance with claim 1 wherein the first scale is a rotary dial and the graduations are equiangularly spaced thereon, and the graduations of the second scale are differently equiangularly spaced.

5. A substantially circular opaque dial mounted for rotation about its center having substantially radially extending equiangularly spaced slots adjacent its periphery through which bands of light may pass and also having window indicia adjacent the slots through which light may pass, an opaque vernier member having a portion disposed beneath the dial and concealed by the latter, said portion having similar slots through which bands of light may pass, the vernier member also having associated window indicia adjacent its slots through which light may pass, an opaque member disposed beneath the vernier member having window means through which light may pass to thence pass through the window indicia of the vernier member, through a pair of aligned slots of the vernier member and dial, and through a single window indicia on the dial, whereby light passing through the last named indicia is visible, the light passing through the indicia on the vernier member is visible, and a band of light passing through aligned slots is visible.

References Cited in the file of this patent

UNITED STATES PATENTS

| | | |
|---|---|---|
| 564,549 | Ayres | July 21, 1896 |
| 2,067,871 | Booth | Jan. 12, 1937 |
| 2,249,655 | Hayes | July 15, 1941 |

FOREIGN PATENTS

| | | |
|---|---|---|
| 280,534 | Switzerland | May 16, 1952 |